United States Patent [19]
Jacovich et al.

[11] Patent Number: 6,129,883
[45] Date of Patent: Oct. 10, 2000

[54] VERTICAL CLAMP INDEX MACHINE

[75] Inventors: William J Jacovich, Newmarket; John Robert Galt, Nobleton; Ronald Ing, Etobicoke, all of Canada

[73] Assignee: Husky Injection Molding Systems Ltd., Canada

[21] Appl. No.: 09/215,823

[22] Filed: Dec. 18, 1998

[51] Int. Cl.⁷ .................................................. B29C 45/16
[52] U.S. Cl. .................................. 264/297.3; 264/328.8; 264/336; 425/556; 425/576
[58] Field of Search ............................ 264/297.2, 297.3, 264/297.8, 255, 328.8, 328.16, 334, 336; 425/576, 439, 574, 575, 572, 592, 556, 547, 548

[56] References Cited

U.S. PATENT DOCUMENTS

| | | |
|---|---|---|
| 5,728,409 | 3/1998 | Schad et al. . |
| 5,750,162 | 5/1998 | Schad et al. . |
| 5,773,049 | 6/1998 | Kashiwa et al. .......................... 264/255 |
| 5,817,345 | 10/1998 | Koch et al. . |
| 5,837,301 | 11/1998 | Arnott et al. ......................... 264/297.8 |

Primary Examiner—Jill L. Heitbrink
Attorney, Agent, or Firm—Bachman & LaPointe, P.C.

[57] ABSTRACT

The present invention relates to an improved injection molding machine and process. The injection molding machine includes a first mold half with at least one mold cavity or mold core and a rotatable turret means rotatable on an axis for rotating a pair of mating mold halves into alignment with the first mold half. Each mating mold half includes at least one mold core or mold cavity matable with the first mold half for forming a mold for forming at least one molded article. The turret block is movable so that a first one of the mating mold halves can be brought into contact with the first mold half. The machine also includes an injection system for injecting molten material into the mold to form the molded article(s). After the injection cycle is completed, the turret block with the molded article(s) thereon is moved away from the first mold half and is rotated by 180 degrees to align a second one of the mating mold halves with the first mold half and to bring the molded article(s) to an ejection position. Thereafter, the molded article(s) are allowed to be dropped via gravity onto a molded article receiving device.

25 Claims, 5 Drawing Sheets

VERTICAL CLAMP INDEX MACHINE

BACKGROUND OF THE INVENTION

The present invention relates to an injection molding process and an injection molding machine which makes part ejection easier.

It is highly desirable to reduce the number of parts in an injection molding machine and hence the overall cost and complexity of such machines. It is also desirable to enable the more efficient use of space and provide for a simplified operation.

Previously, it has been known to simplify injection molding machines by providing a machine which has a first mold half affixed to a stationary mold platen and a rotatable turret block which carries a plurality of mating, second mold halves that can be brought into alignment with the first mold half during the molding cycle. Such injection molding machines are illustrated in U.S. Pat. Nos. 5,728,409; 5,750,162; and 5,817,345, all assigned to the assignee of the instant application, and all incorporated by reference herein. It is also known that such injection molding machines can be vertically oriented so that the turret block moves along a vertical axis towards and away from the first mold half.

It is also known in the prior art that advantages can be gained by providing an improved tiebar construction in which at least two tiebars connect a stationary platen with a movable platen, a stroke cylinder within at least two of the tiebars is operative to move the platens from an open to a closed position and from a closed to an open position, and means are carried by the at least two tiebars to engage a releasable clamping means for clamping the two platens together in the closed position. Such a tiebar construction is shown in co-pending U.S. patent application Ser. No. 09/070,598, filed Apr. 30, 1998, entitled TIEBAR STRUCTURE FOR INJECTION MOLDING MACHINE, to Galt et al. (98–205), which is also assigned to the assignee of the instant application and which is incorporated by reference herein.

Recently, turret block injection molding machines have been further improved by the incorporation of a frameless electric drive for rotating the turret block. Such an injection molding machine is shown in co-pending U.S. patent application Ser. No. 09/072,310, filed May 4, 1998, entitled FRAMELESS ELECTRIC DRIVE FOR TURRET MACHINE, by Looije et al., now U.S. Pat. No. 6,024,558, which is also assigned to the assignee of the instant application and which is incorporated by reference herein.

Despite these improvements, there remains a need for an injection molding machine and an injection molding process which enables molded parts to be more easily ejected and which allows said ejection to occur at any time during a molding cycle.

SUMMARY OF THE INVENTION

Accordingly, it is an object of the present invention to provide an injection molding machine and process which makes part ejection easier.

It is yet a further object of the present invention to provide an injection molding machine and process in which ejection can occur at any time in the molding cycle.

It is yet a further object of the present invention to provide an injection molding machine which eliminates complicated and expensive rotary services manifold and provides better access to service the mold components allowing a shorter stroke requirement.

It is still a further object of the present invention to provide an injection molding machine which reduces the overall size (footprint) of the machine.

The foregoing objects are attained by the injection molding machine and process of the present invention.

An injection molding machine in accordance with the present invention includes a first mold half with at least one mold cavity or at least one mold core and a rotatable turret means rotatable on an axis for rotating a pair of mating mold halves into alignment with the first mold half. Each mating mold half includes at least one mold core or mold cavity matable with the first mold half for forming a mold for molding at least one molded article such as at least one preform. The machine further includes means for moving a first one of the mating mold halves into contact with the first mold half, means for injecting molten material into the mold to form the at least one molded article, means for moving the first mold half with the at least one molded article thereon away from the first mold half, means for rotating the turret means by 180 degrees to align a second one of the mating mold halves with the first mold half, and means for receiving the at least one molded article aligned with the turret means so that each molded article ejected from the mating mold halves on the turret means can fall into contact with the receiving means via gravity.

The injection molding process of the present invention comprises the steps of providing an injection molding machine having a first mold half with at least one mold cavity or mold core and a rotatable turret means which is rotatable on an axis for rotating a pair of mating mold halves into alignment with the first mold half, each of the mating mold halves including at least one mold core or mold cavity matable with the first mold half for forming a mold for molding at least one molded article; moving the rotatable turret means relative to the first mold half to bring a first one of the mating mold halves into contact with the first mold half to form a mold; injecting molten material into the mold to form at least one injection molded article; moving the turret means away from the first mold half after the injecting step has been completed and rotating the turret means by 180 degrees to bring a second one of the mating mold halves into alignment with the first mold half; and ejecting each molded article on said first mating mold half and allowing each molded article to drop via gravity into contact with a molded article receiving means.

Other details of the injection molding machine and process of the present invention, as well as other objects and advantages attendant thereto, are set forth in the following detailed description and the accompanying drawings, in which like reference numerals depict like elements.

DETAILED DESCRIPTION OF THE PREFERRED EMBODIMENT(S)

Figure 1:
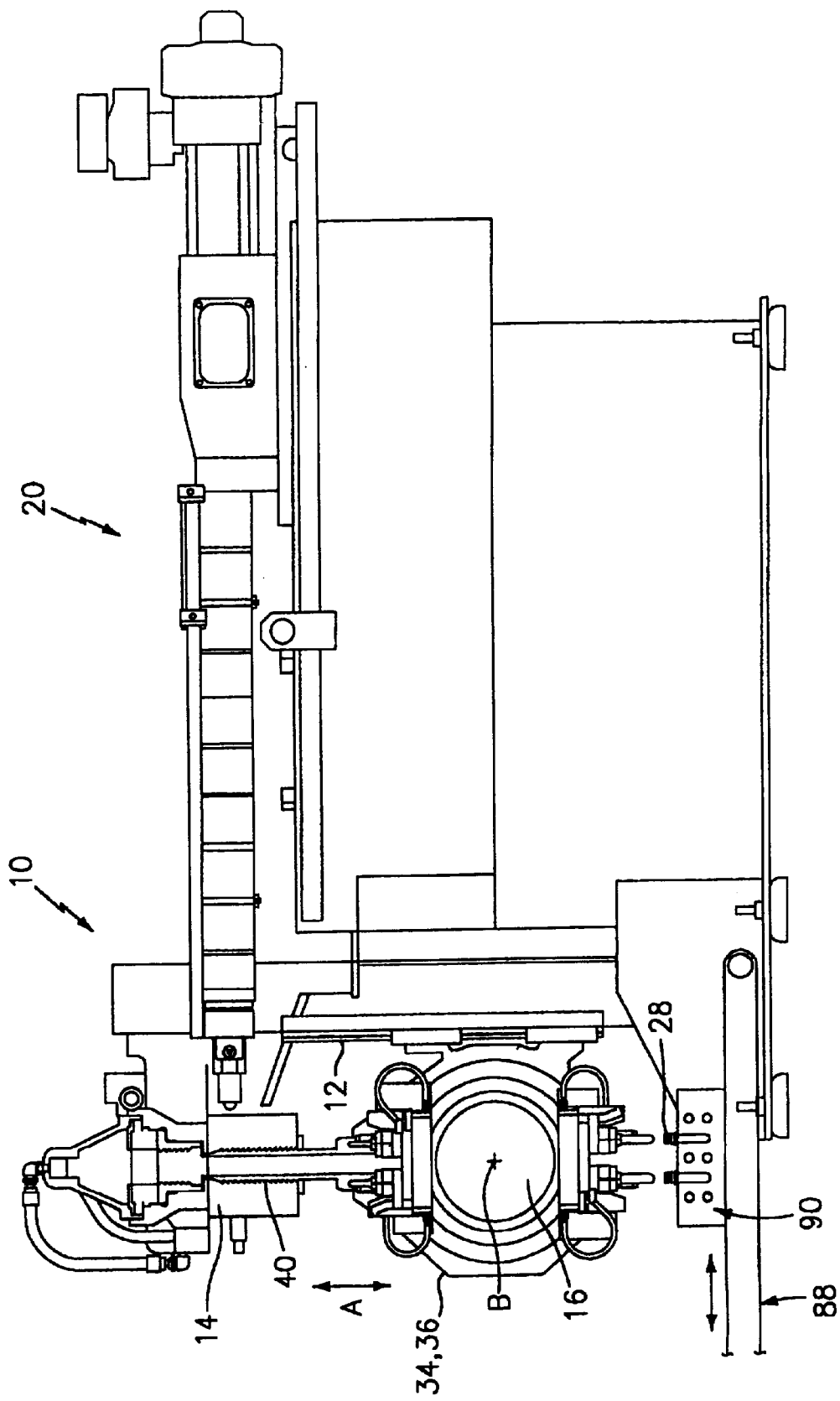
FIG. 1 is a side view of a vertical index injection molding machine in accordance with the present invention.
Figure 2:
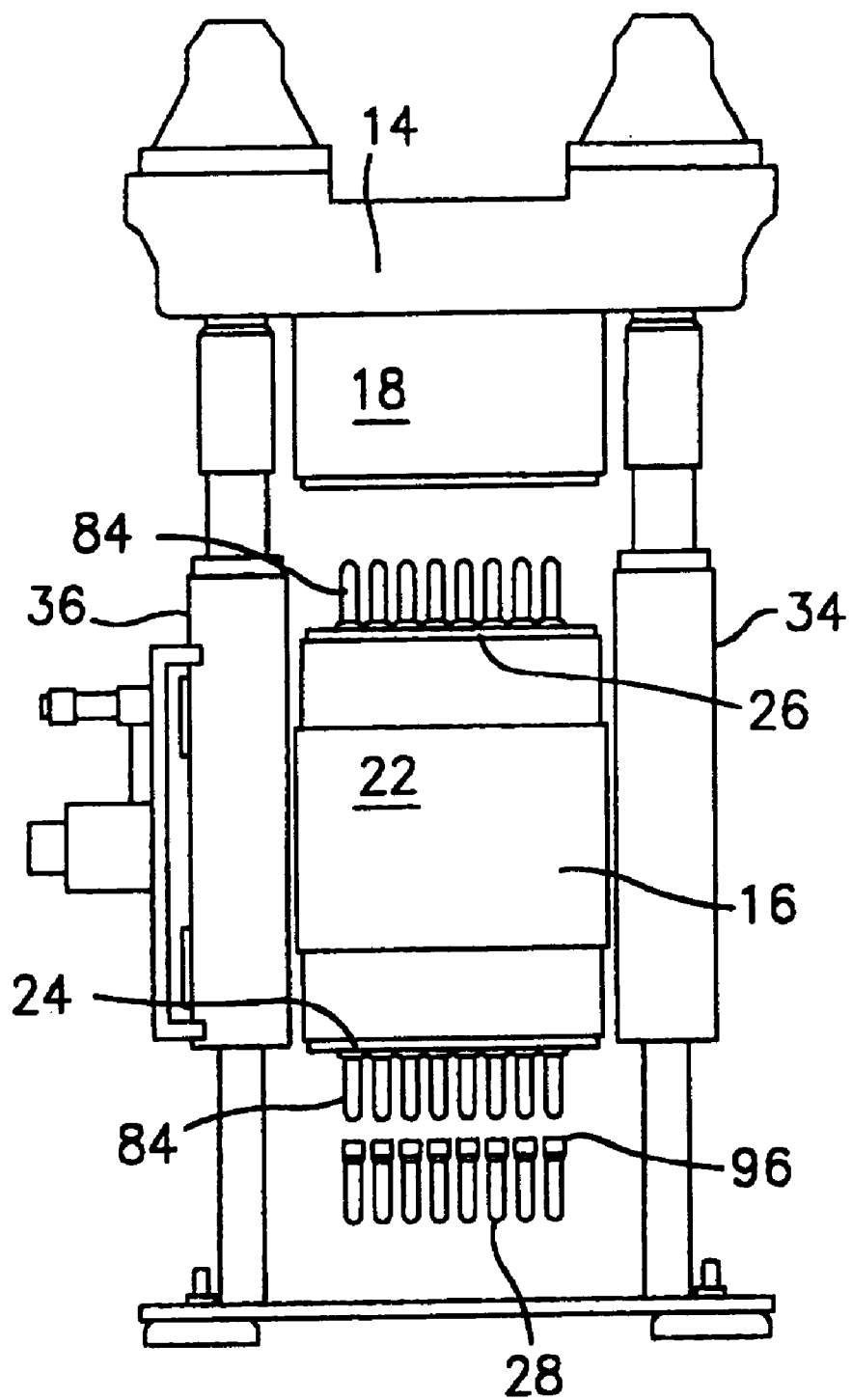
FIG. 2 is an end view of the injection molding machine of FIG. 1.

Referring to FIGS. 1–2, an index machine 10 is shown including a base 12, a stationary platen 14, and a movable platen 16 which is movable with respect to the stationary platen 14. The stationary platen 14 has a first mold half 18 affixed to it via bolts or other suitable fastening devices (not shown) known in the art. The first mold half 18 contains at least one mold core or, alternatively, at least one mold cavity. In a preferred construction, the first mold half 18 contains a plurality of mold cavities for forming a plurality of molded articles such as preforms.

Molten material to be formed into at least one molded article is fed into the mold core(s) or mold cavity(ies) in the first mold half via an injection unit 20 which mates with openings or gates in the mold core(s) or mold cavity(ies). The injection unit 20 may comprise any suitable injection unit known in the art. For example, a conventional RS or two stage injection unit may be provided to inject molten material such as plastic resin into the side of a hot runner assembly (not shown) installed in the first mold half 18.

The movable platen 16 is formed by a rotary turret block 22 which has a pair of mating mold halves 24 and 26 mounted to two opposed faces. Each of the mating mold halves 24 and 26 has at least one mold core or at least one mold cavity for mating with the at least one mold core or the at least one mold cavity on the first mold half 18. The number of mold cores or cavities on the mating mold halves 24 and 26 corresponds with the number of mold cores or mold cavities on the first mold half 18. In a preferred construction, each of the mating mold halves 24 and 26 is provided with a plurality of mold cores.

Figure 3:
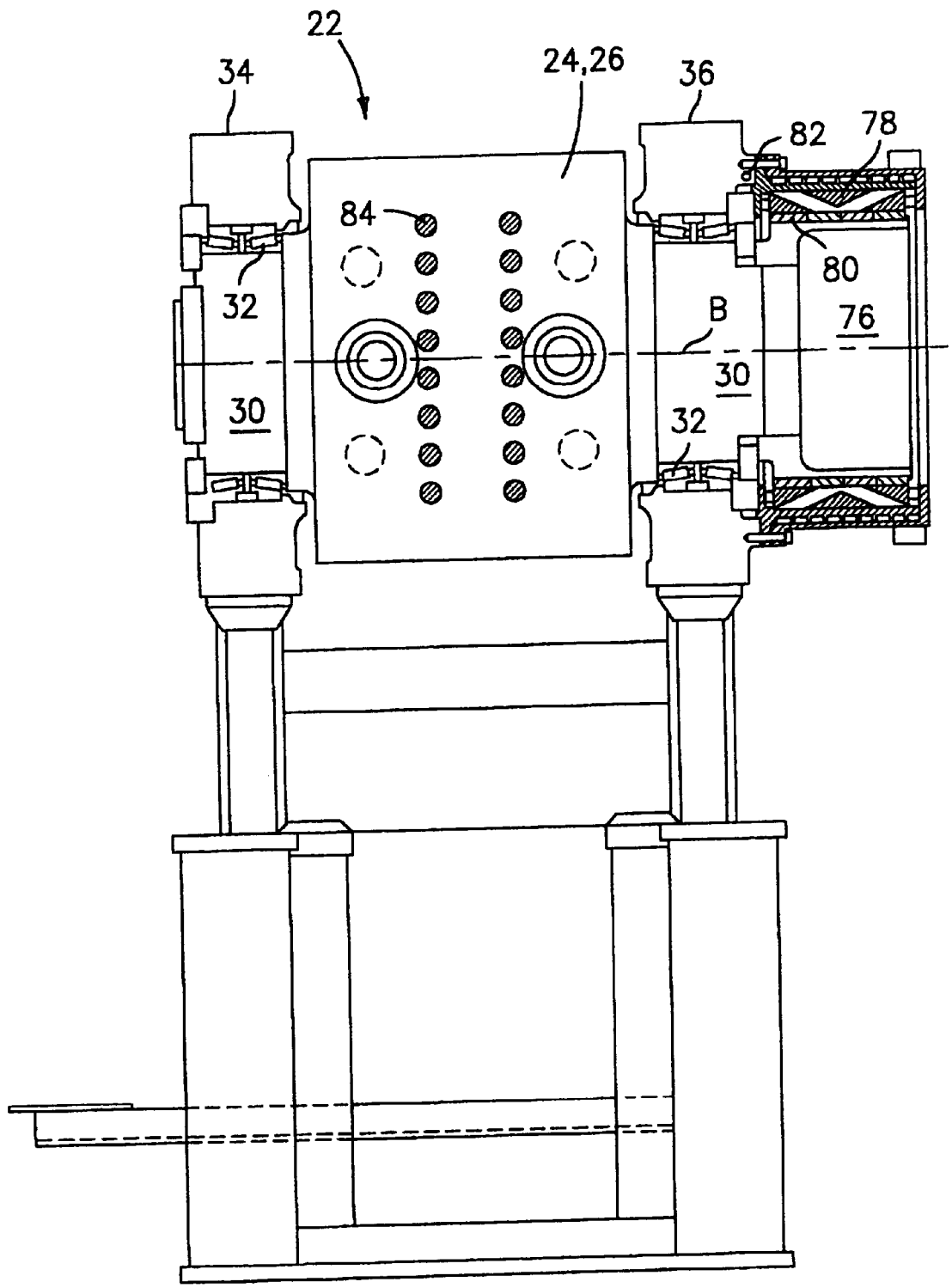
FIG. 3 is a sectional view showing the frameless electric motor drive for the turret block.

By providing the turret block 22, molded article(s) 28 which have been formed during a previous molding cycle may be cooled while new articles are being formed during a subsequent mold cycle. The turret block 22 is designed to rotate about a horizontal axis B. As shown in FIG. 3, the turret block 22 is mounted on a plurality of trunnions 30 running in bearings 32 mounted in carriers 34 and 36.

During the molding cycle, the turret block 22 is moved along a vertical axis A towards and away from the stationary platen 14. To accomplish this, the carriers 34 and 36, in which the turret block is mounted, are moved toward and away from the stationary platen 14, along four guide rods 38 that connect the base 12 to the stationary platen 14.

Figure 4:
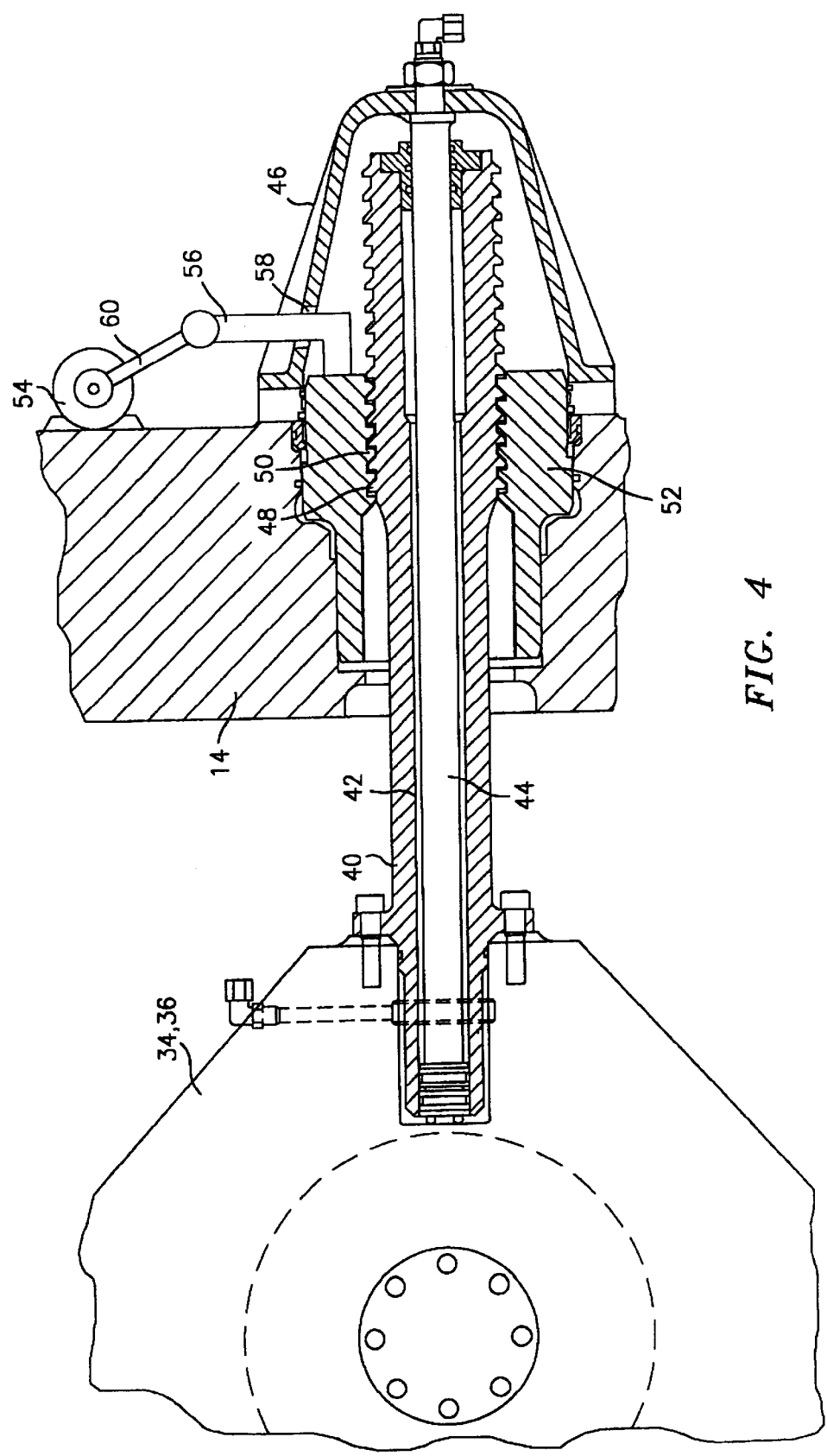
FIG. 4 is a sectional view of the clamp arrangement for the injection molding machine of FIG. 1 at minimum shutheight.

Two tiebars 40 are provided bolted to the carriers 34 and 36. As shown in FIG. 4, each of the tiebars 40 includes an inside stroke cylinder 42, the rod 44 of which is fixed to housing 46 which in turn is bolted to stationary platen 14. Referring to the detailed view of FIG. 4, each tiebar 40 includes external teeth 48 that are engageable with corresponding internal teeth 50 of rotating clamp piston 52, with the clamp piston 52 contained in stationary platen 14. The clamp piston 52 includes a row of teeth and an adjacent row free from teeth so that on rotation of the clamp piston, the clamp piston teeth 50 alternately engage and disengage the tiebar teeth 48. Clamp piston 52 may be rotated by any desired and convenient means, such as a cylinder means 54 acting on pin 56 via slot 58 in housing 46, such as cylinder 54 bolted to the stationary platen 14 with linkage means 60 connecting pins 56 together and causing rotation of pistons 52.

Figure 5:
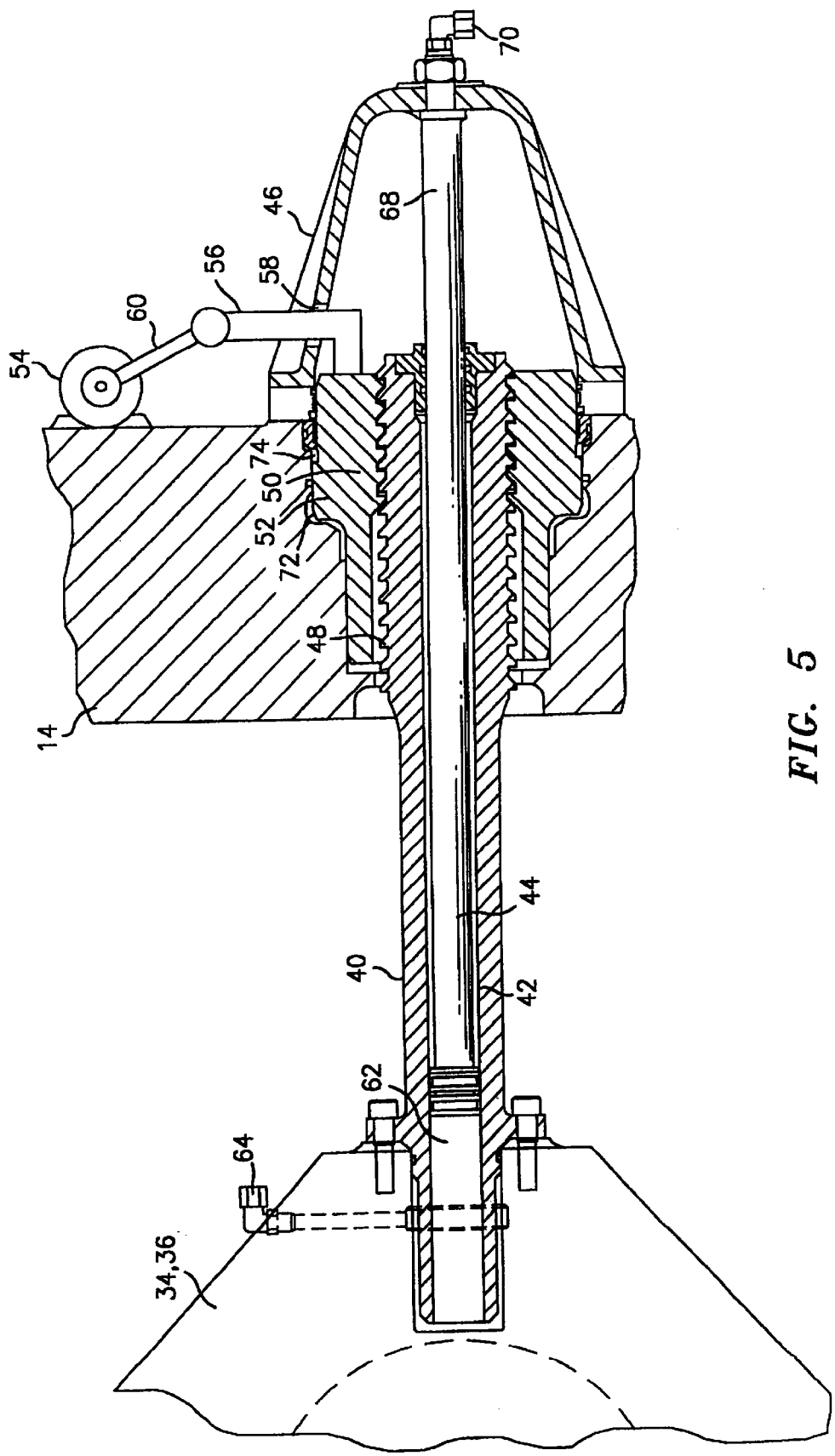
FIG. 5 is a sectional view of the clamp arrangement for the injection molding machine of FIG. 1 at maximum shutheight.

In operation, with particular reference to FIGS. 4 and 5, pin 56 rotates clamp piston 52 so that clamp piston teeth 50 are disengaged from teeth 48 on tiebars 40. High pressure oil is then supplied to the piston end 62 of stroke cylinder 42 via line 64 causing stroke cylinder rod 44 to extend and move carriers 34 and 36 and turret block 22 away from the stationary platen 14, thereby opening the mold. In order to close the mold, oil is supplied to the rod side 68 of stroke cylinder 42 via line 70, thereby retracting stroke cylinder rod 44 and closing the clamp until the mold is closed. Pin 56 is then activated by cylinder 54 and linkage means 60 to engage clamp piston teeth 50 with tiebar teeth 48. High pressure oil is then provided to the clamp piston cylinder 72 causing the clamp pistons to clamp the mold. After molding, high pressure oil is provided to the mold break cylinder 74 causing clamp piston 52 to act on the back side of tiebar teeth 48 and urge the mold open. After a short stroke, clamp piston 52 is de-energized and pin 56 actuated by cylinder 54 and linkage means 60 causes the clamp piston 52 to rotate to disengage clamp piston teeth 50 from tiebar teeth 48 so that stroke cylinder 42 can open the mold.

As previously mentioned, the turret block 22 rotates about an axis B. This is done with a drive system which preferably comprises at least one frameless, brushless electric motor 76. As can be seen in FIG. 3, the motor includes a stator 78 having a plurality of coils mounted to the carrier 36 and a rotor 80 which rotates about an axis coincident with the axis B. In accordance with the present invention, the rotor 80 is directly coupled to the turret trunnion 30 and thereby the turret block 22 by one or more bolts or other suitable connecting means, so that direct transmission of rotation is effected. As used herein, the term "directly coupled" means that there are no transmissions, belts, gears, gearboxes or the like between the rotor 80 and the turret block 22. If desired, two motors 76 may be connected to the turret block 22. When two motors 76 are used, the rotor 80 of each is directly coupled to a respective one of the trunnions 30. One type of motor which may be used for the motor(s) 76 is a Kollmorgen RBE brushless, frameless motor.

If desired, one or more cooling circuits 82 may be added to the carrier 36 to dissipate heat that is generated by the coils of the stator 78. The cooling circuits 82 may comprise cooling channels within the carrier 36 for carrying a cooling fluid such as a cooling gas or water.

In operation, a first one 24 of the mating mold halves is aligned with the first mold half 18 by rotating the turret block 22. The turret block 22 is then moved towards the first mold half 18 as previously discussed until it reaches a closed and clamped position. Molten material is then injected into the mold formed by the first mold half 18 and the first one 24 of the mating mold halves. After the injection cycle has been completed and the molded article(s) 28 thus formed have cooled for a period of time sufficient to at least partly solidify each molded article, the turret block 22 with the first one 24 of the mating mold halves is moved away from the first mold half 18. As it moves away, the turret block 22 is rotated by 180 degrees about the axis B by the motor(s) 76. This causes a second one 26 of the mating mold halves to become aligned with the first mold half 18 and for the first one 24 of the mating mold halves, with the molded article(s) 28 thereon, to reach an ejection position.

Each mating mold half 24 and 26 may be provided with any suitable ejection means known in the art. For example, each molded article 28 may be held to a core pin 84 by an applied vacuum in a known manner. Upon cessation of the application of the vacuum, each molded article 28 may drop into contact with a receiving means 86 via gravity. Alternatively, the ejection means may comprise ejection pins, plates or the like for releasing each molded article 28 from the respective mating mold half and again allowing each molded article to drop via gravity into contact with the receiving means 86.

The receiving means 86 may comprise any suitable receiving means known in the art. For example, it may be a conveyor 88 for taking each molded article to another station. Alternatively, the receiving means may comprise a cooled carrier 90 having tubes (not shown) for receiving the molded articles 28, which carrier may be transported to another station by conveyor 88. The cooled carrier 90 may cool the molded articles 28 either conductively or convectively.

The injection molding machine of the present invention provides a number of advantages. Most notably, the molded article(s) 28 may be removed or ejected from the mating mold halves 24 and 26 at any time in the cycle. Thus, the molded articles 28 may be removed or ejected when they are fully solidified or just partly solidified, i.e. sufficiently cooled and hardened to withstand contact with the receiving means 86. As a result, no time is lost during the cycle. Part ejection is made easier in that the molded parts or articles 28 fall under gravity into contact with the receiving means 86. An advantage to having the articles fall under gravity is that the articles can fall with their neck regions 96 in a desired orientation, such as an "up" position, when the articles 28 are positioned on core pins 84 on the mating mold halves or a "down" position when the articles 28 are positioned in cavities (not shown) on the mating mold halves.

Other advantages to the machine of the present invention is that the molded articles 28 do not have to pass through four positions to reach the ejection position. Instead, they move 180 degrees between a molding position and an ejection position. This simplifies and speeds up the cycle time. If a molded article 28 requires further cooling, that cooling can be carried out at a station external to the injection molding machine 10. Still further, a complicated and expensive rotary services manifold can be eliminated.

Other advantages to the machine of the present invention is that (1) the overall size (footprint) of the machine is reduced; and (2) better access to service the mold components can be provided, thus allowing shorter stroke requirement.

The vertical orientation of the clamp system allows good access underneath the end of the unit to easily install a conveyor or part cooling handling system.

It is apparent that there has been provided in accordance with the present invention a vertical clamp index machine which fully satisfies the means, objects, and advantages set forth hereinbefore. While the invention has been described in combination with specific embodiments thereof, it is evident that many alternatives, modifications, and variations will be apparent to those skilled in the art. Accordingly, it is intended to embrace all such alternatives, modifications, and variations which fall within the spirit and broad scope of the appended claims.

What is claimed is:

1. A process for injection molding comprising the steps of:
providing an injection molding machine having a first mold half with one of at least one mold cavity and at least one mold core and a turret means rotatable on a first axis for rotating a pair of mating mold halves into alignment with said first mold half, each of said mating mold halves including one of at least one mold cavity and at least one mold core matable with said first mold half for forming a mold for molding at least one molded article;
moving said rotatable turret means towards said first mold half along a second axis substantially perpendicular to said first axis to bring a first one of said mating mold halves into contact with said first mold half;
injecting molten material into said mold to form said at least one molded article;
moving said rotatable turret means along said second axis away from said first mold half;
rotating said rotatable turret means about said first axis by 180 degrees so as to align a second one of said mating mold halves with said first mold half and to bring said first one of said mating mold halves to an ejection position; and
ejecting said at least one molded article from said first one of said mating mold halves and allowing said at least one molded article to drop via gravity onto a receiving means positioned beneath said first mold half and said turret means and aligned with said first mold half and said turret means along said second axis during ejection of said at least one molded article.

2. The process according to claim 1, wherein said rotatable turret means moving step comprises moving said rotatable turret means along a vertical axis.

3. The process according to claim 1, wherein said rotating step comprises rotating said rotatable turret means about a substantially horizontal axis.

4. The process according to claim 1, wherein said rotating step comprises rotating said rotatable turret means with a frameless electric motor having a stator and a rotor which rotates about an axis coincident with said first axis.

5. The process according to claim 1, wherein said ejecting step comprises ejecting said at least one molded article in a partially solidified condition.

6. The process according to claim 1, wherein said ejecting step comprises ejecting said at least one molded article in a fully solidified condition.

7. The process according to claim 1, wherein said ejecting step comprises ejecting each said molded article so that its neck portion is in an up position.

8. The process according to claim 1, wherein said ejecting step comprises ejecting said at least one molded article in a cooled and hardened state which is sufficient to withstand contact with said receiving means.

9. The process according to claim 1, wherein said ejecting step comprises ejecting each said molded article so that its neck portion is in a down position.

10. The process according to claim 1, wherein said receiving means comprises a conveyor and said at least one molded article is dropped onto said conveyor which is aligned with said turret means along said second axis during said ejection.

11. The process according to claim 1, wherein said receiving means comprises a cooled carrier and said at least one molded article is dropped into said cooled carrier which is aligned with said turret means along said second axis during said ejection.

12. The method according to claim 1, wherein said step of moving said rotatable turret means towards said first mold half comprises moving said rotatable turret means upwardly towards said first mold half, and wherein said step of moving said rotatable turret means away from said first mold half comprises moving said rotatable turret means downwardly away from said first mold half.

13. An injection molding machine comprising:
a first mold half with one of at least one mold cavity and at least one mold core;
turret means rotatable on a first axis for rotating a pair of mating mold halves into alignment with said first mold half;
each of said mating mold halves including one of at least one mold cavity and at least one mold core matable with said first mold half for forming a mold for forming at least one molded article;

means for moving said turret means towards said first mold half along a second axis perpendicular to said first axis for bringing a first one of said mating mold halves into contact with said first mold half;

means for injecting molten material into said mold formed by said first mold half and said first one of said mating mold halves so as to form said at least one molded article;

means for moving said turret means and said first one of said mold halves along said second axis away from said first mold half;

means for rotating said turret means 180 degrees about said first axis after said turret means has been moved away from said first mold half so as to align a second one of said mating mold halves with said first mold half and to bring said first one of said mating mold halves to an ejection position;

means for receiving each said molded article, said receiving means being positioned beneath said first mold half and said turret means and being aligned with said first mold half and said turret means along said second axis during ejection; and means for ejecting each said molded article from said first one of said mating mold halves and allowing each said article to drop via gravity and into contact with said receiving means.

14. The injection molding machine of claim 13, wherein said means for rotating said turret means comprises means for rotating said turret means about a substantially horizontal axis.

15. The injection molding machine of claim 13, further comprising:

carrier means for supporting said turret means for rotation; and said rotating means comprises a frameless electric motor drive incorporated into said carrier means and directly coupled to said turret means.

16. The injection molding machine of claim 15, further comprising said frameless electric motor drive including a stator and a rotor and said rotor rotating about an axis coincident with said first axis.

17. The injection molding machine of claim 13, wherein said means for moving said turret means towards and away from said first mold half comprises means for moving said turret means along a vertical axis.

18. The injection molding machine of claim 17, further comprising:

said first mold half being connected to a stationary platen;

two carrier means for supporting said turret means; and said means for moving said turret means comprising at least two tiebars connecting the carrier means with said stationary platen.

19. The injection molding machine of claim 18, wherein said means for moving said turret means comprises a stroke cylinder within each of said tiebars, releasable clamping means to clamp the first mold half and one of said mating mold halves in a closed position, and means carried by each of said tiebars to engage said clamping means.

20. The injection molding machine of claim 13, wherein said receiving means comprises a conveyor aligned with said turret means along said second axis during said ejection.

21. The injection molding machine of claim 13, wherein said receiving means comprises a cooled carrier aligned with said turret means along said second axis during said ejection.

22. The injection molding machine of claim 13, wherein said ejecting means comprises means for ejecting each said molded article while it is a partially solidified condition.

23. The injection molding machine of claim 13, wherein said ejecting means comprises means for ejecting each said molded article while it is in a fully hardened condition.

24. The injection molding machine of claim 13, wherein said first one of the mating mold halves has a plurality of core pins and said ejecting means drops each molded article with its neck portion in an up position.

25. The injection molding machine of claim 13, wherein said first one of the mating mold halves has a plurality of cavities and said ejecting means drops each molded article with its neck portion in a down position.

* * * * *